(12) United States Patent
Zheng et al.

(10) Patent No.: US 11,464,092 B2
(45) Date of Patent: Oct. 4, 2022

(54) LIGHTING APPARATUS

(71) Applicant: XIAMEN ECO LIGHTING CO. LTD., Xiamen (CN)

(72) Inventors: Changyuan Zheng, Xiamen (CN); Shuisheng Wen, Xiamen (CN); Bin Liu, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 17/477,162

(22) Filed: Sep. 16, 2021

(65) Prior Publication Data

US 2022/0086985 A1 Mar. 17, 2022

(30) Foreign Application Priority Data

Sep. 16, 2020 (CN) .......................... 202022034107.1

(51) Int. Cl.
*H05B 45/37* (2020.01)
*H05B 45/325* (2020.01)
*H05B 47/155* (2020.01)
*H05B 47/19* (2020.01)
*H05B 45/44* (2020.01)
*H05B 45/20* (2020.01)

(52) U.S. Cl.
CPC ............. *H05B 45/37* (2020.01); *H05B 45/20* (2020.01); *H05B 45/325* (2020.01); *H05B 45/44* (2020.01); *H05B 47/155* (2020.01); *H05B 47/19* (2020.01)

(58) Field of Classification Search
CPC ...... H05B 45/37; H05B 45/20; H05B 45/325; H05B 45/44; H05B 47/155; H05B 47/19; H05B 47/16
See application file for complete search history.

(56) References Cited

U.S. PATENT DOCUMENTS

| 2017/0215246 | A1* | 7/2017 | Hollander | .............. H05B 45/56 |
| 2019/0098734 | A1* | 3/2019 | Dolan | ................... H05B 47/185 |
| 2019/0338895 | A1* | 11/2019 | Jeswani | ................... F21V 23/04 |

* cited by examiner

*Primary Examiner* — Minh D A
(74) *Attorney, Agent, or Firm* — Chun-Ming Shih; Lanway IPR Services

(57) ABSTRACT

A lighting apparatus includes a rectifier, a set of light sources and a set of driver modules. The rectifier has a neutral node connected to a neutral wire and a hot node connected to a hot wire for connecting to an external power source. A manual switch is placed between the external power source and the neutral node. The switch controller is connected to the neutral node for detecting an operation of the manual switch among multiple candidate operations. Each candidate operation is associated to a set of control signals. Each driver module has a first end connected to the rectifier and a second end connected to the switch controller for receiving a corresponding control signal to drive one corresponding light source from the set of light sources. The driver module includes a constant current source and a switch unit.

20 Claims, 7 Drawing Sheets

LIGHTING APPARATUS

FIELD

The present invention is related to a lighting apparatus, and more particularly related to a lighting apparatus with a flexible control.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to consider how to control a device in addition to the design of the light device.

Although current technology provides various ways to control a light device, but different ways may take different cost. It is important and beneficial to design a way with low cost while providing a flexible and convenient way to control the light device. It is important to consider how to control a device in addition to the design of the light device.

Although current technology provides various ways to control a light device, but different ways may take different cost. It is important and beneficial to design a way with low cost while providng a flexible and convenient way to control the light device. It is important to consider how to control a device in addition to the design of the light device.

Although current technology provides various ways to control a light device, but different ways may take different cost. It is important and beneficial to design a way with low cost while providng a flexible and convenient way to control the light device. It is important to consider how to control a device in addition to the design of the light device.

Although current technology provides various ways to control a light device, but different ways may take different cost. It is important and beneficial to design a way with low cost while providng a flexible and convenient way to control the light device.

SUMMARY

In some embodiments, a lighting apparatus includes a rectifier, a set of light sources and a set of driver modules.

The rectifier has a neutral node connected to a neutral wire and a hot node connected to a hot wire for connecting to an external power source.

A manual switch is placed between the external power source and the neutral node.

The switch controller is connected to the neutral node for detecting an operation of the manual switch among multiple candidate operations.

Each candidate operation is associated to a set of control signals.

Each driver module has a first end connected to the rectifier and a second end connected to the switch controller for receiving a corresponding control signal to drive one corresponding light source from the set of light sources.

The driver module includes a constant current source and a switch unit.

The switch unit determines to turn on or turn off the constant current source for providing or not providing a driving current to the one corresponding light source.

In some embodiments, the switch controller is actuated when receiving a first turn-on operation from the manual switch.

In some embodiments, the switch controller indicates a default driver module to turn on one corresponding light source if no second turn-on operation occurs after a first turn-off operation within a predetermined time period.

In some embodiments, the switch controller indicates a second default driver module to turn on one corresponding light source if a second turn-on operation occurs after the first turn-off operation within the predetermined time period.

In some embodiments, the set of light sources has more than two light sources.

The other light source is turned on separately by detecting a number of consequent turn-on and turn-off operations within a corresponding time period.

In some embodiments, the switch controller has a timer for determining the predetermined time period.

In some embodiments, the switch controller has a capacitor and a comparator.

The comparator determines a capacitor value fo the capacitor to determine whether the predetermined time period has passed.

In some embodiments, the lighting apparatus may also include a setting switch for associating an operation of the manual switch to turn-on and turn-off of the set of light sources.

In some embodiments, a gap time period between the first turn-on operation and the second turn-on operation is compared to a set of time ranges.

The gap time period is converted by the switch controller to adjust a ratio of light intensities of the a first light source and a second light source of the set of light sources.

In some embodiments, the switch controller converts an operation pattern of the manual switch to the set of control signals.

In some embodiments, the set of control signals are PWM (Pulse Width Modulation) signals.

In some embodiments, the manual switch is a wall switch with a turn-on mode and a turn-off mode.

In some embodiments, the manual switch is a rotation switch with a turn-on mode, a turn-off mode and a volume value.

In some embodiments, the switch controller uses the volume value to select a corresponding light source of the set of light sources to turn on.

In some embodiments, each light source has multiple LED modules.

The set of light sources are alternatively arranged over a light source plate for mixing arrangements of the multiple LED modules of the set of light sources.

The multiple LED modules of different light sources emit lights of different light parameters.

In some embodiments, the light parameter includes color temperature.

In some embodiments, further includes a wireless circuit for receiving an external command from an external device.

The external command is supplied to the switch controller to determine controlling of the set of light sources.

In some embodiments, an operation pattern of the manual switch actuates a pairing of the wireless circuit with the external device.

In some embodiments, the pairing is a Blue-tooth pairing.

In some embodiments, the set of light sources include more than two light modules disposed at two different locations sharing the same rectifier.

DETAILED DESCRIPTION

Figure 1:
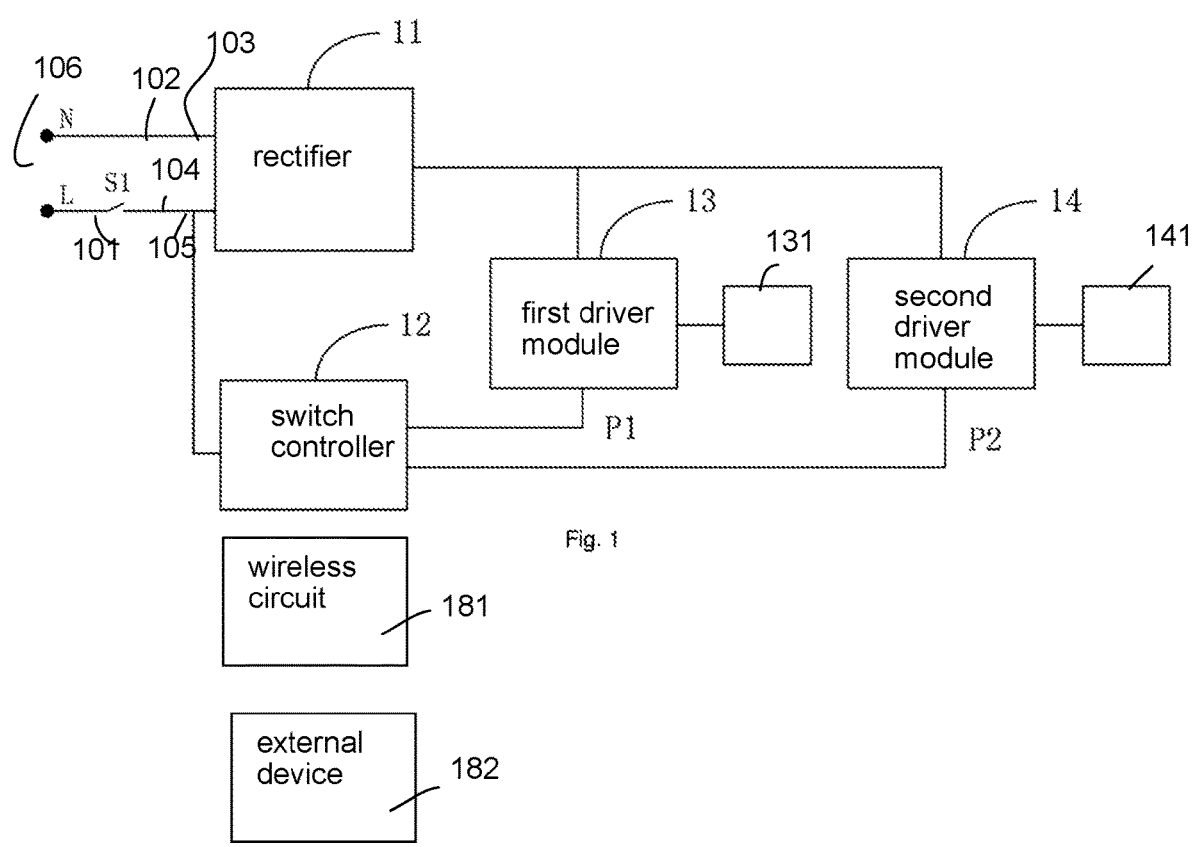
FIG. 1 illustrates a circuit diagram of a lighting apparatus embodiment.

In FIG. 1, a lighting apparatus includes a rectifier 11*t*, a set of light sources and a set of driver modules. In this example, the set of light sources has a first light source 131 and a second light source 141. The set of driver modules has a first driver module 13 and a second driver module 14. Each driver module is corresponding to a light source. For example, the first driver module 13 is corresponding to the first light source 131 and the second driver module 14 is corresponding to the second light source 141.

The rectifier 11 has a neutral node 105 connected to a neutral wire 104 and a hot node 103 connected to a hot wire 102 for connecting to an external power source 106.

A manual switch 101 is placed between the external power source 106 and the neutral node 105.

The switch controller 12 is connected to the neutral node 105 for detecting an operation of the manual switch 101 among multiple candidate operations. The following examples show some examples how the manual switch 101 may perform over a time period. Please be noted that these examples are not used for limiting the scope of the present invention.

Each candidate operation is associated to a set of control signals. There are multiple driver modules, and the set of control signals may be associated to the multiple driver modules. For example, the set of control signals include a turn-on control signal and a turn-off control signal in a predetermined order. For example, the first control signal, the turn-on signal, is assigned to the first driver module 13 and the second control signal, turn-off signal, is assigned to the second driver module 14. The first driver module 13 and the second driver module 14 may respectively act according to their corresponding control signal, to turn on the first light source 131 and to turn off the second light source 141.

In another embodiments, the set of control signals may include a time sequence control over a time period. For example, a first operation pattern, like to turn-on for 1 second and turn-off for 0.5 second and then to turn-on for 1 second before turn-off, may be associated to a sleep mode light pattern to be performed by the first light source 131 and the second light source 141. For example, the first light source 131 may have colder color temperature and the second light source 141 may have a warmer color temperature. The switch controller 12 receives the operation pattern mentioned above and then turns on the first light source 131 first for 5 minutes and then gradually increase the light of the second light source 141 and decrease the light of the first light source 131.

Each driver module 13, 14 has a first end connected to the rectifier 11 and a second end connected to the switch controller 12 for receiving a corresponding control signal to drive one corresponding light source 131, 141 from the set of light sources.

Figure 2:
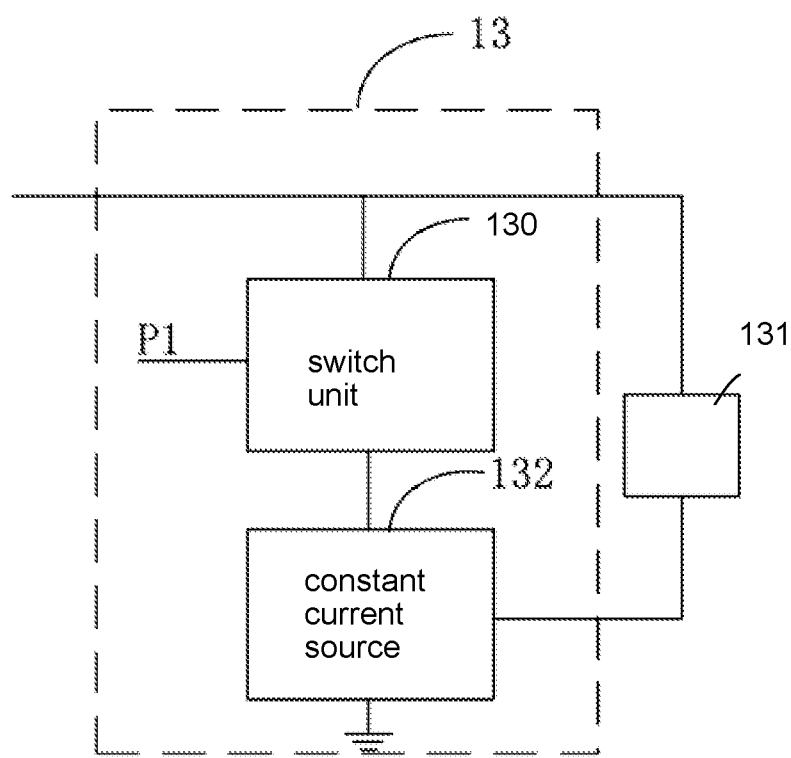
FIG. 2 illustrates a driver module structure.

In FIG. 2, the driver module 13 includes a constant current source 132 and a switch unit 130.

The switch unit 130 determines to turn on or turn off the constant current source 132 for providing or not providing a driving current to the one corresponding light source 131.

In some embodiments, the switch controller is actuated when receiving a first turn-on operation from the manual switch.

In some embodiments, the switch controller indicates a default driver module to turn on one corresponding light source if no second turn-on operation occurs after a first turn-off operation within a predetermined time period. For example, the first light source is the default light source when the manual switch is turned on for the first time. If the manual switch is turned on and quickly turned off and then turn on again, the switch controller turns on the second light source. With such manner, multiple light sources may be controlled with a simple manual switch.

In some embodiments, the switch controller indicates a second default driver module to turn on one corresponding light source if a second turn-on operation occurs after the first turn-off operation within the predetermined time period.

In some embodiments, the set of light sources has more than two light sources.

The other light source is turned on separately by detecting a number of consequent turn-on and turn-off operations within a corresponding time period.

For example, if there are four light sources in the set of light sources, four times of turn-on and turn-off within a time period may be associated by the switch controller to turn on the fourth light source.

Figure 3:
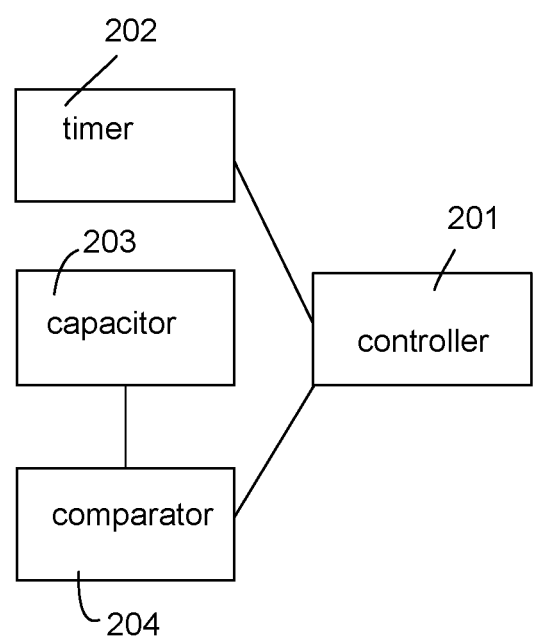
FIG. 3 illustrates two examples for determining a time period.

In FIG. 3, the switch controller has a timer 202 for determining the predetermined time period. For example, a counter is used as a timer 202 for telling a controller 201 of the switch controller for determining whether there is a consequent operation of the manual switch within a predetermined time period to match to a pre-defined operation of the manual switch.

In FIG. 3, the switch controller has a capacitor 203 and a comparator 204.

The comparator 204 determines a capacitor value fo the capacitor 203 to determine whether the predetermined time period has passed. For example, the capacitor 203 is charged and then gradually loses the capacitor value over time. The comparator 204 compares the capacitor value of the capacitor 203 with a reference value. If the capacitor value is lower than the reference value, it is determined that the corresponding time period has passed.

Figure 4:
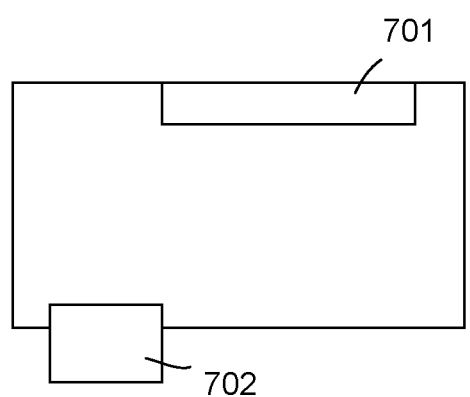
FIG. 4 illustrates a setting switch disposed on a lighting apparatus.

In FIG. 4, the lighting apparatus may also include a setting switch 702 for associating an operation of the manual switch to turn-on and turn-off of the set of light sources 701. For example, the setting switch is a sliding switch to select one from multiple options. Each operation associates a set of manual operations of the manual switch to a set of actions to be controlled by the switch controller.

In some embodiments, a gap time period between the first turn-on operation and the second turn-on operation is compared to a set of time ranges.

For example, the time interval, e.g. the gap time period, between a first turn-on and a second turn-on may be 1 second, 3 second or 5 second. The three different time intervals may correspond to three different actions to be performed by the switch controller.

The gap time period is converted by the switch controller to adjust a ratio of light intensities of the a first light source and a second light source of the set of light sources.

In some embodiments, the switch controller converts an operation pattern of the manual switch to the set of control signals.

In some embodiments, the set of control signals are PWM (Pulse Width Modulation) signals. For example, the constant current source receives the PWM signal to adjust a current value.

In some embodiments, the manual switch is a wall switch with a turn-on mode and a turn-off mode.

In some embodiments, the manual switch is a rotation switch with a turn-on mode, a turn-off mode and a volume value.

In some embodiments, the switch controller uses the volume value to select a corresponding light source of the set of light sources to turn on. For example, when the manual switch is a rotation switch, in addition to turn-on or turn-off, there is a volume value, which may be sent to the switch controller with a variant resistor or a variant voltage signal. These signals may be converted to corresponding actions to be taken and controlled by the switch controller.

Figure 5:
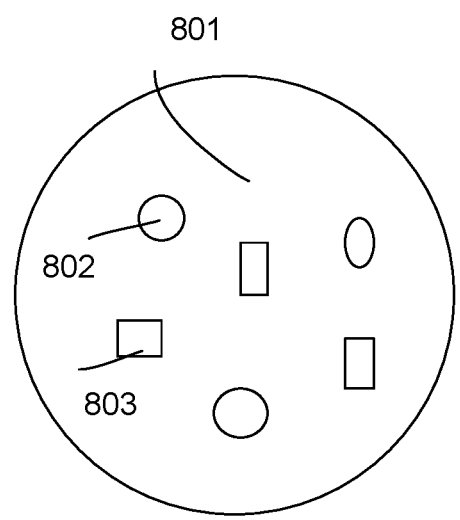
FIG. 5 illustrates a light source plate mounted with multiple light sources.

In FIG. 5, each light source has multiple LED modules.

For example, a first light source has three LED modules 802 marked with circular shapes. A second light source three LED modules 803 marked with square shapes.

The set of light sources are alternatively arranged over a light source plate for mixing arrangements of the multiple LED modules of the set of light sources.

The multiple LED modules of different light sources emit lights of different light parameters.

In some embodiments, the light parameter includes color temperature.

In FIG. 1, the lighting apparatus further includes a wireless circuit 181 for receiving an external command from an external device 182.

The external command is supplied to the switch controller 12 to determine controlling of the set of light sources.

In some embodiments, an operation pattern of the manual switch actuates a pairing of the wireless circuit 181 with the external device 182.

In some embodiments, the pairing is a Blue-tooth pairing. For example, it is a protocol to send a beacon signal for pairing. A predetermined pattern of operating the manual switch, e.g. quick turn-on and turn-off for three times may be used to pair the wireless circuit 181 to the external device 182.

Figure 6:
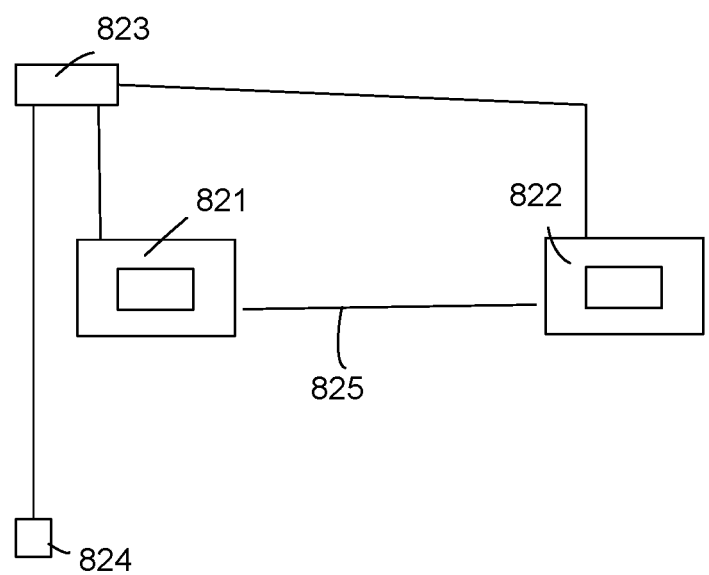
FIG. 6 illustrates two light modules sharing a rectifier.

In FIG. 6, the set of light sources include more than two light modules disposed at two different locations sharing the same rectifier. For example, two light modules 821, 822 which may have downlight shapes mounted in separate downlight junction boxes with a distance 825. The two light modules 821, 822 share the same wall switch 824 and the rectifier 823. The operation of the manual switch is used for a switch controller to turn on or turn off separately the light modules 821, 822. This saves cost and simplifies the control.

Figure 7:
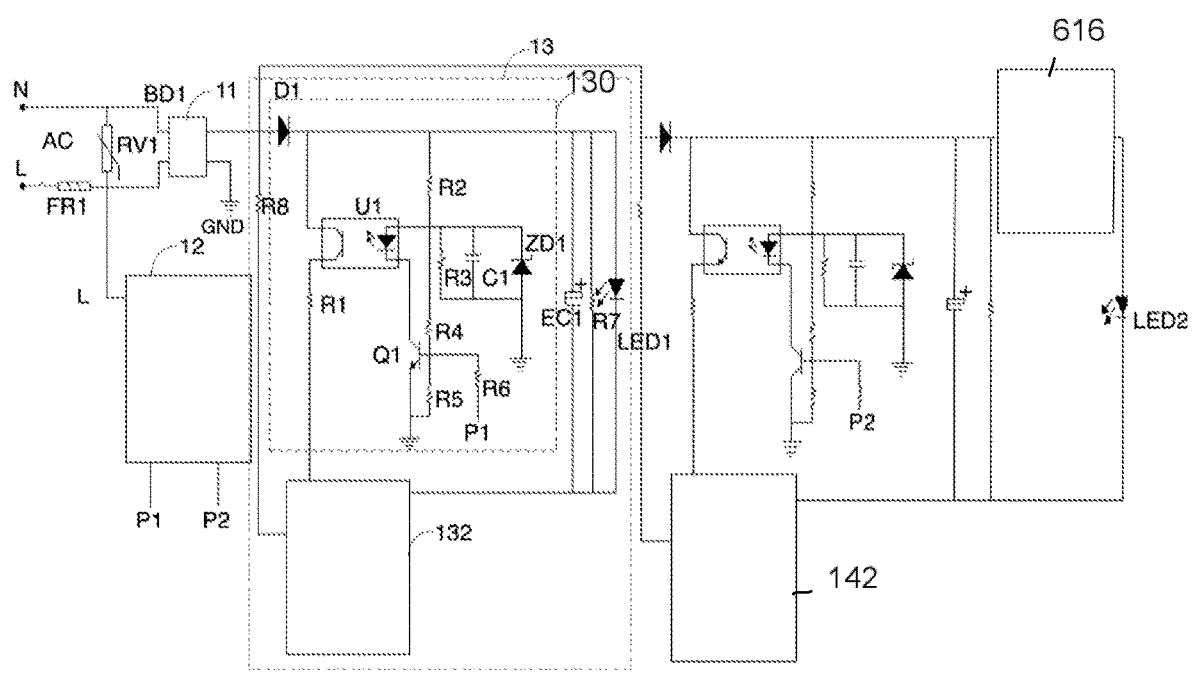
FIG. 7 shows a detail circuit diagram to implement the embodiment of FIG. 1.

FIG. 7 shows a detail circuit diagram. In FIG. 7. The rectifier 11 has a bridge circuit for transforming an AC power source to a DC power source. The switch controller 12 detects the operation of the manual switch via a FR1 resistor to issue a set of control signals P1 and P2.

There is an optical coupler U1 in the switch unit of the driver module 13 for controlling the constant current source 132. There is a transistor Q1, resistors R2, R3, R4, R5, R5 together with a capacitor C1 and a Zenith diode ZD1 disposed in the switch unit 130. The current is supplied to LED 1. The LED 2 has a similar driver module with a second current source 142 controlled by a similar switch unit. There is also a anti-blinking circuit disposed for connecting to LED 2 to prevent blinking of the LED 2.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
    a rectifier with a neutral node connected to a neutral wire and a hot node connected to a hot wire for connecting to an external power source, wherein a manual switch is placed between the external power source and the neutral node;
    a switch controller connected to the neutral node for detecting an operation of the manual switch among multiple candidate operations, wherein each candidate operation is associated to a set of control signals;
    a set of light sources; and
    a set of driver modules, wherein each driver module has a first end connected to the rectifier and a second end connected to the switch controller for receiving a corresponding control signal to drive one corresponding light source from the set of light sources, wherein the driver module comprises a constant current source and a switch unit, wherein the switch unit determines to turn on or turn off the constant current source for providing or not providing a driving current to the one corresponding light source.

2. The lighting apparatus of claim 1, wherein the switch controller is actuated when receiving a first turn-on operation from the manual switch.

3. The lighting apparatus of claim 2, wherein the switch controller indicates a default driver module to turn on one corresponding light source if no second turn-on operation occurs after a first turn-off operation within a predetermined time period.

4. The lighting apparatus of claim 3, wherein the switch controller indicates a second default driver module to turn on one corresponding light source if a second turn-on operation occurs after the first turn-off operation within the predetermined time period.

5. The lighting apparatus of claim 4, wherein the set of light sources has more than two light sources, wherein the other light source is turned on separately by detecting a number of consequent turn-on and turn-off operations within a corresponding time period.

6. The lighting apparatus of claim 3, wherein the switch controller has a timer for determining the predetermined time period.

7. The lighting apparatus of claim 3, wherein the switch controller has a capacitor and a comparator, wherein the comparator determines a capacitor value fo the capacitor to determine whether the predetermined time period has passed.

8. The lighting apparatus of claim 2, further comprising a setting switch for associating an operation of the manual switch to turn-on and turn-off of the set of light sources.

9. The lighting apparatus of claim 2, wherein a gap time period between the first turn-on operation and the second turn-on operation is compared to a set of time ranges, wherein the gap time period is converted by the switch controller to adjust a ratio of light intensities of the a first light source and a second light source of the set of light sources.

10. The lighting apparatus of claim 1, wherein the switch controller converts an operation pattern of the manual switch to the set of control signals.

11. The lighting apparatus of claim 10, wherein the set of control signals are PWM (Pulse Width Modulation) signals.

12. The lighting apparatus of claim 1, wherein the manual switch is a wall switch with a turn-on mode and a turn-off mode.

13. The lighting apparatus of claim 1, wherein the manual switch is a rotation switch with a turn-on mode, a turn-off mode and a volume value.

14. The lighting apparatus of claim 13, wherein the switch controller uses the volume value to select a corresponding light source of the set of light sources to turn on.

15. The lighting apparatus of claim 1, wherein each light source has multiple LED modules, wherein the set of light sources are alternatively arranged over a light source plate for mixing arrangements of the multiple LED modules of the set of light sources, wherein the multiple LED modules of different light sources emit lights of different light parameters.

16. The lighting apparatus of claim 15, wherein the light parameter comprises color temperature.

17. The lighting apparatus of claim 1, further comprises a wireless circuit for receiving an external command from an external device, wherein the external command is supplied to the switch controller to determine controlling of the set of light sources.

18. The lighting apparatus of claim 17, wherein an operation pattern of the manual switch actuates a pairing of the wireless circuit with the external device.

19. The lighting apparatus of claim 18, wherein the pairing is a Blue-tooth pairing.

20. The lighting apparatus of claim 1, wherein the set of light sources include more than two light modules disposed at two different locations sharing the same rectifier.

* * * * *